(12) United States Patent
Damsgard et al.

(10) Patent No.: US 7,067,167 B2
(45) Date of Patent: Jun. 27, 2006

(54) METHOD FOR MAKING SWEET COOKIE DOUGH HAVING AN IMPRINTED SURFACE

(75) Inventors: Christopher E. Damsgard, New Brighton, MN (US); James R. Baeten, Bloomington, MN (US)

(73) Assignee: General Mills Marketing, Inc., Minneapolis, MN (US)

(*) Notice: Subject to any disclaimer, the term of this patent is extended or adjusted under 35 U.S.C. 154(b) by 208 days.

(21) Appl. No.: 10/356,341

(22) Filed: Jan. 31, 2003

(65) Prior Publication Data

US 2004/0151807 A1 Aug. 5, 2004

(51) Int. Cl.
*A21C 11/02* (2006.01)

(52) U.S. Cl. ............... 426/383; 426/420; 426/128; 426/119; 426/121; 425/94

(58) Field of Classification Search ........ 426/393, 426/420, 128, 119, 121, 383; 425/94
See application file for complete search history.

(56) References Cited

U.S. PATENT DOCUMENTS

| | | | |
|---|---|---|---|
| 1,291,168 A | 1/1919 | Ruger | |
| 1,977,099 A * | 10/1934 | Thompson | 425/97 |
| 3,280,740 A * | 10/1966 | Lewis et al. | 101/483 |
| 3,498,019 A | 3/1970 | Rait | 53/28 |
| 3,536,014 A | 10/1970 | Kuchuris et al. | 107/8 |
| 3,537,406 A | 11/1970 | Ort | 107/54 |
| 3,677,769 A * | 7/1972 | King | 426/27 |
| 4,085,563 A | 4/1978 | Egee et al. | 53/59 R |
| 4,103,038 A | 7/1978 | Roberts | 426/601 |
| 4,111,624 A | 9/1978 | Hanson | 425/135 |
| 4,170,659 A | 10/1979 | Totino et al. | 426/95 |
| 4,212,609 A | 7/1980 | Fay | 425/100 |
| 4,223,204 A | 9/1980 | Benedict | 219/243 |
| 4,285,978 A | 8/1981 | Quinlivan | 426/87 |
| 4,517,209 A | 5/1985 | Thornton et al. | 426/383 |
| 4,532,751 A * | 8/1985 | Mally et al. | 53/396 |
| 4,551,337 A | 11/1985 | Schmit et al. | 426/94 |
| 4,578,273 A | 3/1986 | Krubert | 426/87 |
| 4,586,888 A | 5/1986 | Anderson | 425/362 |
| 4,596,714 A | 6/1986 | Brabbs | 426/297 |
| 4,630,426 A | 12/1986 | Gentry | 53/428 |
| 4,643,084 A * | 2/1987 | Gomez | 99/352 |
| 4,661,360 A | 4/1987 | Smith | 426/94 |
| 4,702,926 A | 10/1987 | Fowler | 426/283 |
| 4,835,001 A | 5/1989 | Mijac et al. | 426/556 |

(Continued)

OTHER PUBLICATIONS

4 Pages "Peanut-Butter Crisscrosses" Recipe, Family Circle Cookies and Candies Cookbook, pp. 45 and 46 (1978).

*Primary Examiner*—Milton I. Cano
*Assistant Examiner*—Sarah L. Kuhns
(74) *Attorney, Agent, or Firm*—Annette M. Frawley; Karrie G. Weaver

(57) ABSTRACT

Rapid, efficient, and systematic processes and apparatuses for making repeatable imprints on multiple, individual sweet dough pieces are provided. An advantage of the process is the ease of making uniform imprints that are aligned with the individual dough pieces as formed and deposited. Such provides the ability to create a three-dimensional pattern on the surface of a sweet dough piece, particularly a soft cookie dough piece. The methods can be accomplished by high-speed wire cutting production methods as well as other dough piece depositing apparatuses, such as roller-type depositors.

29 Claims, 7 Drawing Sheets

U.S. PATENT DOCUMENTS

| | | | |
|---|---|---|---|
| 4,859,486 A | 8/1989 | Douglass | 426/629 |
| 4,936,200 A | 6/1990 | Buhler et al. | 99/353 |
| 4,938,126 A | 7/1990 | Rubio et al. | 99/349 |
| 4,988,276 A | 1/1991 | Moeller | 425/290 |
| 5,104,667 A | 4/1992 | Moeller | 426/144 |
| 5,162,119 A | 11/1992 | Pappas et al. | 425/92 |
| 5,349,759 A | 9/1994 | Anton et al. | 33/524 |
| 5,378,486 A | 1/1995 | Sullivan | 426/549 |
| 5,382,440 A | 1/1995 | Sullivan | 426/138 |
| 5,400,614 A | 3/1995 | Feola | 62/233 |
| 5,417,989 A * | 5/1995 | Atwood et al. | 426/27 |
| 5,421,713 A | 6/1995 | Backus et al. | 425/209 |
| 5,466,479 A | 11/1995 | Frye | 426/611 |
| 5,534,281 A | 7/1996 | Pappas et al. | 426/383 |
| 5,538,744 A * | 7/1996 | Miller et al. | 426/94 |
| 5,716,658 A * | 2/1998 | Donnelly et al. | 426/420 |
| 5,731,012 A | 3/1998 | Backus et al. | 425/151 |
| RE36,147 E | 3/1999 | Backus et al. | 425/209 |
| 5,996,476 A * | 12/1999 | Schultz | 99/349 |
| 6,024,997 A | 2/2000 | Blaschke et al. | 426/144 |
| 6,057,501 A | 5/2000 | Hale | 84/470 R |
| 6,174,556 B1 | 1/2001 | Bornhorst et al. | 426/503 |
| 6,242,014 B1 | 6/2001 | Xu | 426/18 |
| 6,251,455 B1 | 6/2001 | Thomas | 426/306 |
| 6,251,456 B1 | 6/2001 | Maul et al. | 426/306 |
| 6,280,783 B1 | 8/2001 | Blaschke et al. | 426/144 |
| 6,284,295 B1 | 9/2001 | Blaschke et al. | 426/144 |
| 6,306,445 B1 | 10/2001 | Xu et al. | 426/20 |
| 6,312,743 B1 | 11/2001 | Blaschke et al. | 426/144 |
| 6,413,563 B1 | 7/2002 | Blaschke et al. | 426/144 |
| 6,561,235 B1 * | 5/2003 | Finkowski et al. | 141/172 |
| 2001/0036498 A1 | 11/2001 | Blaschke et al. | 426/496 |
| 2002/0110631 A1 | 8/2002 | Blaschke et al. | 426/565 |
| 2003/0017244 A1 | 1/2003 | Blaschke et al. | 426/503 |
| 2003/0041917 A1 | 3/2003 | Finkowski et al. | 141/129 |
| 2003/0131919 A1* | 7/2003 | King et al. | 156/73.1 |

* cited by examiner

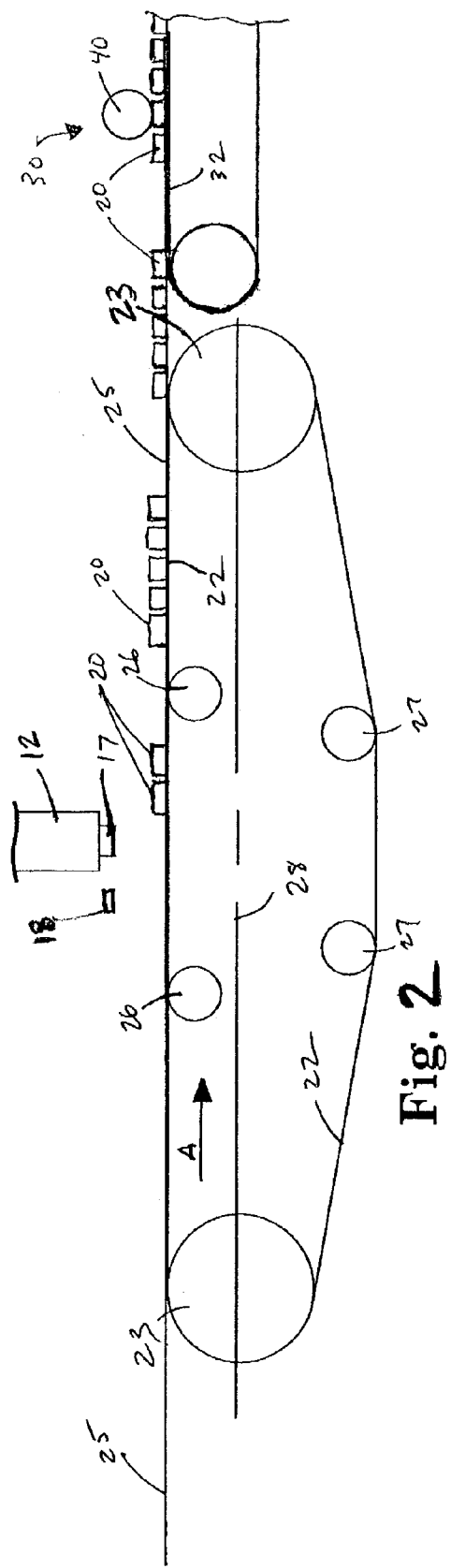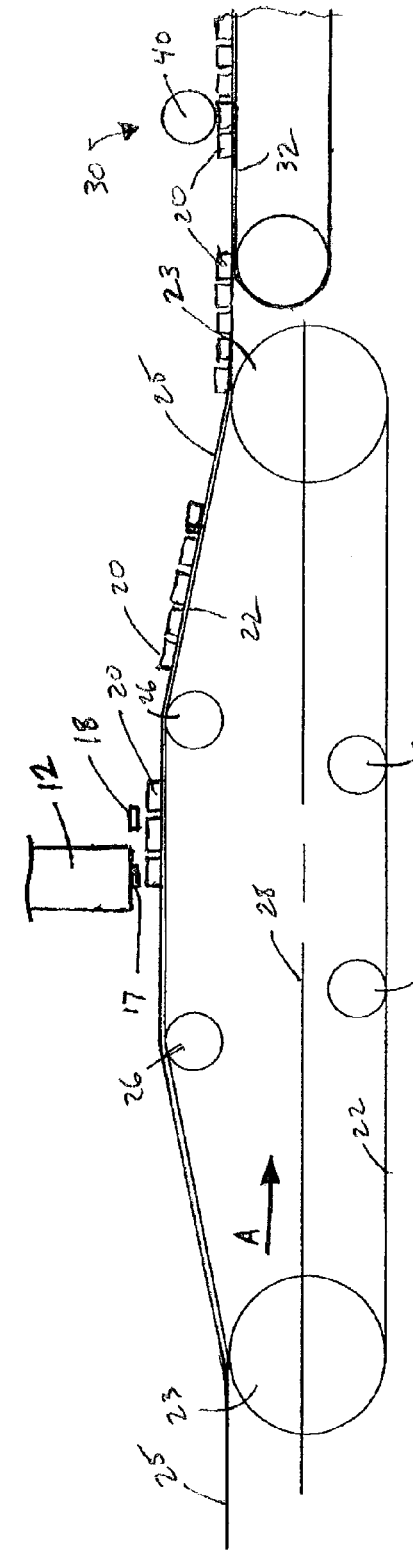

METHOD FOR MAKING SWEET COOKIE DOUGH HAVING AN IMPRINTED SURFACE

FIELD OF THE INVENTION

The current invention relates to methods useful for making sweet dough products having a patterned appearance. In particular, the invention relates to methods for making individual sweet cookie dough pieces having an imprint, such that the individual sweet cookie dough pieces simulate a homemade appearance.

BACKGROUND

Consumers commonly enjoy the convenience of packaged food products such as dough products. In particular, raw dough products have gained commercial success as provided in frozen or refrigerated forms to facilitate consumers making home-baked dough products. Moreover, such raw dough products are typically packaged to facilitate consumer use, as desired. Potential consumers of such refrigerated or frozen dough products include individual in-home consumers, as well as in-store bakeries and restaurants that bake cookies on-site and sell the cookies to consumers at the bakery or restaurant.

Many dough products suitable for packaging as frozen or refrigerated products have been developed. As an example, sweet dough products such as certain types of cookies are frequently packaged in frozen or refrigerated forms. More recently, these frozen or refrigerated cookie dough products designed for home consumers have been provided as a separable block, where the consumer must first separate the individual portions of the block prior to baking. Another format for home consumer frozen or refrigerated cookie dough products provides individual cookie pucks, or preformed cookies, that the consumer simply transfers from the packaging to a baking pan for baking at the appropriate temperature. According to this latter format, no manipulation of the dough product is required by the consumer.

One type of dough used to produce cookies is a comparatively stiff, dry and crumbly dough of the type which when baked produces relatively hard cookies (for example, animal cookies and the typically round wafers that are often made into cookie sandwiches by placing a layer of frosting or confection between a pair of them). This type of baking dough typically lends itself to rotary molding devices, as it can easily be compressed into relatively shallow configured cavities in the rotary die, the cavity design and hardness of dough contributing to a clean complete release from such cavities subsequent to shaping. Typically, these dry doughs are characterized by containing comparatively low sugar and low shortening, typically in the range of 20–25 baker's percent of each.

Another type of dough used to produce cookies is "soft" dough, from which softer baked goods are made, in particular the soft type of cookies regarded as being more like homemade cookies. Such soft dough is considerably more flowable as well as more sticky than the drier dough discussed above. Further, such soft doughs typically will not pack in the same sense as the drier cookie doughs and are thus much more difficult to force into the configured die cavities and the like of a rotary molding device so as to completely fill them. Such soft doughs are typically more suitable for wirecut processes of manufacturing. The soft cookie dough is generally characterized by comparatively high sugar and high shortening content, typically in the range of 50–70 baker's percent or more, for each ingredient.

Generally, soft cookie doughs possess adequate cohesiveness to hold together, yet yield clean separations of the individual dough pieces as the individual dough pieces are cut by a conventional wirecut apparatus.

As mentioned above, one known method for making cookie products on a mass production basis utilizes a wire cutting operation. According to this process, appropriately formulated dough is fed from a hopper downwardly through one or more nozzles located above a conveyor. As the dough leaves a nozzle in the form of a dough cylinder, a cutting wire is passed through the dough so that discrete pieces of dough are separated from the dough cylinder to fall or be placed onto the conveyor. The dough pieces on the conveyor can then be collected from the conveyor for packaging and storage at refrigerated or frozen temperatures. Wirecut methods provide a high-speed method for making cookies, typically producing about 1800 cookies or more per minute depending on extrusion and conveyor speeds as well as on the number of forming orifices provided by one or more forming heads.

In certain applications, it may be desirable to provide an ornamental design or imprint on the surface of sweet cookie dough products, to create the appearance of a home-baked dough product. For example, with peanut butter cookies, one technique commonly practiced in the home is to press or pat raw cookie dough with a fork after formulating the dough and prior to baking, to create a tine appearance on the surface of a cookie. Although such manual patterning of the dough in the home provides an aesthetically pleasing product after it is baked, such manual pattering is not usable in high speed cookie manufacturing processes that are practiced on a plant scale. Moreover, alignment of a desired pattern is difficult when manufacturing cookies on a large scale. Alignment is even more difficult when the dough is provided as individual dough pieces. Moreover, the act of contacting an individual dough piece with a patterning or stamping apparatus can alter the dough piece, by picking up the dough piece, moving the dough piece on the conveyor, and/or providing a deformed pattern (for example, a smeared pattern if the dough piece is moving when the pattern is applied), or even a deformed dough piece. These problems can be exacerbated at the high speeds of wire cutting processes described above.

SUMMARY OF THE INVENTION

The present invention preferably provides several advantages, including a rapid, efficient, and systematic process for making repeatable imprints on multiple, individual sweet dough pieces. Another advantage of the process is the ease of making uniform imprints that are aligned with the individual dough pieces. Yet another advantage of the present invention is the ability to create a three-dimensional pattern on the surface of a sweet dough piece, particularly a soft cookie dough piece.

The inventive methods can be particularly beneficial when used in combination with high-speed wire cutting production methods as well as other dough piece depositing apparatuses.

The inventive methods can be used to provide cookie dough products that are refrigerated or frozen and then shipped to the consumer. In some preferred embodiments, the cookie dough products are provided as "freezer-to-oven" cookie dough products, where the consumer does not have to thaw the cookie dough products before placing the dough products into the oven. In these embodiments, the consumer simply removes the cookie dough pieces from the freezer and places the dough pieces directly into the oven. These embodiments provide particular time savings to the consumer, who does not have to either thaw or place an imprint on the individual dough pieces before baking.

Thus, the inventive methods provide cookie dough products that can be baked at the point of purchase from frozen or refrigerated dough pieces. These and other advantages will be apparent from the following drawings and detailed description of the invention.

BRIEF DESCRIPTION OF THE DRAWINGS

The accompanying drawings, which are incorporated in and constitute part of the present application, illustrate several aspects of the invention and together with a description of the embodiments serve to explain the principles of the invention. A brief description of the drawings is as follows:

FIG. 2 is a schematic side view of a dough piece deposition process with subsequent imprinting of the dough pieces;

FIG. 3 is a schematic side view similar to FIG. 2, but with a conveyor portion of the system raised for receiving deposited dough pieces;

DETAILED DESCRIPTION OF THE INVENTION

Figure 1:
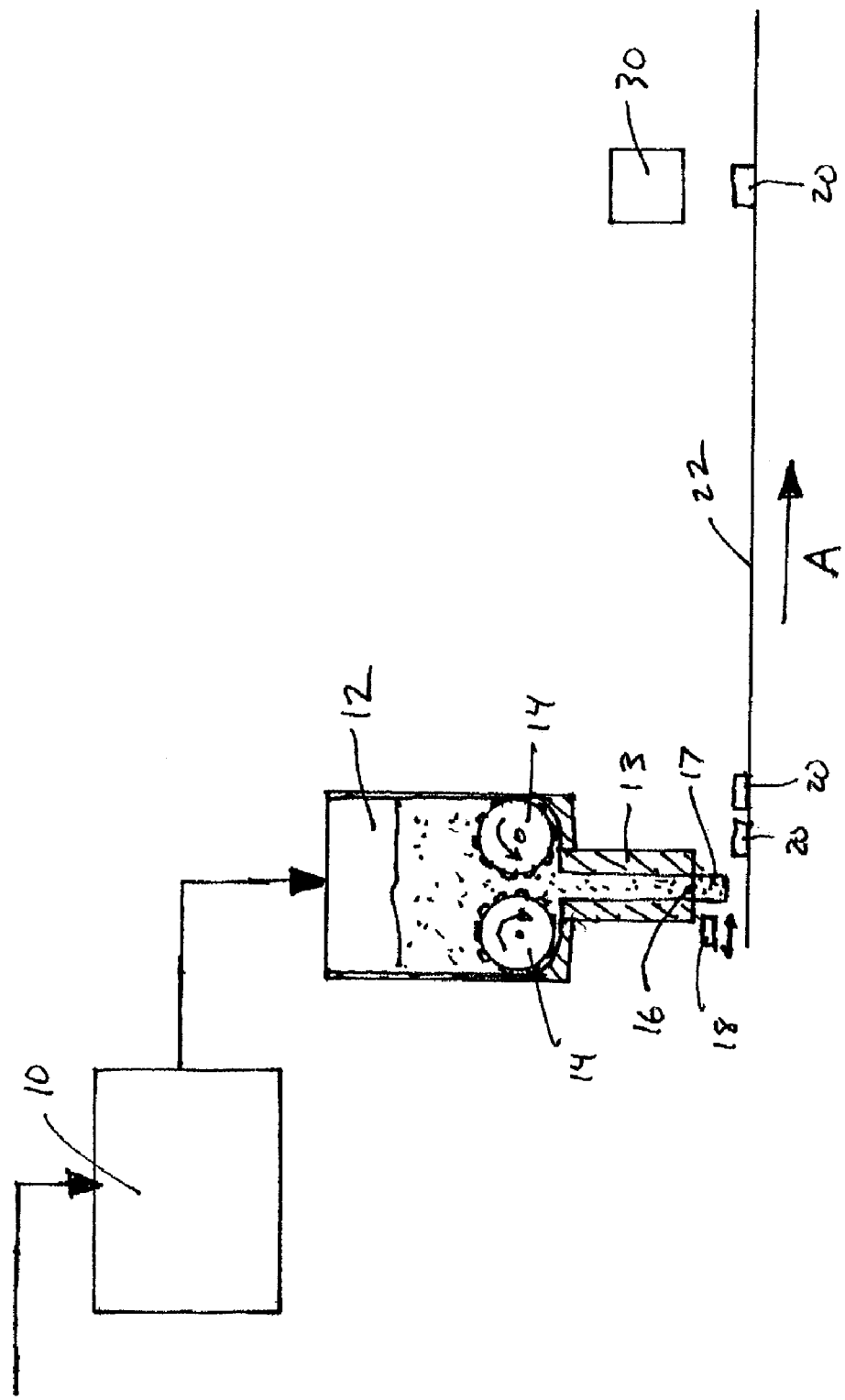
FIG. 1 is a schematic illustration of one embodiment of a method and apparatus in accordance with the present invention for providing controlled and aligned imprints to cookie dough pieces as part of an in-line manufacturing process.

The present invention provides methods for providing an ornamental imprint on at least one surface of an individual soft cookie dough piece (dough piece meaning prior to baking). In particular, the present invention has been developed for the ability to provide an ornamental imprint that is aligned, in a desired way, to each individual soft cookie dough piece that has been formed, and which aligned imprint is to be appreciable in a subsequently baked cookie. That is, by the present invention, an ornamental imprint can be formed that is aligned to each individual soft cookie dough piece after the individual soft cookie dough pieces have been formed and provided on a conveyor. The inventive methods thus produce a soft cookie dough product that comprises a soft cookie dough piece containing an imprint on a surface thereof.

In accordance with the present invention, an ornamental imprint can be created by any suitable process that adds to, removes from, or otherwise modifies an individual soft cookie dough piece in some desired way such as in appearance. For example, an ornamental imprint can be formed on an individual soft cookie dough piece by applying a suitable pattern mechanism that contains the pattern to be imprinted, to a surface of the individual dough piece. Such a pattern can be controllably applied while the cookie is moving or stationary. Alternatively, an ornamental imprint can be formed on an individual soft cookie dough piece by directing high-pressure air to the dough piece, thereby controllably deforming a surface of the dough piece and defining a desired imprint In yet another embodiment, an ornamental imprint can be provided during the cookie dough piece forming stage, such as by utilizing a rotary molding apparatus baying patterned pistons for applying the imprint while driving the dough piece from a mold cavity.

Preferably, the method provides individual soft cookie dough products with a reproducible ornamental imprint on a surface, wherein, upon baking, the ornamental imprint is maintained upon the surface of the dough product. As used herein, "ornamental" refers to a pattern or imprint formed on a surface of the soft cookie dough product that does not significantly affect the structural integrity of the soft cookie dough product. In other words, the ornamental imprint primarily provides an aesthetic feature to the soft cookie dough product that is appreciable after baking and that does not serve a significantly functional role in the size, overall shape or configuration of the soft cookie dough product.

Preferably, the ornamental imprint is maintained upon the surface of the soft cookie dough product upon baking of the cookie dough. As used herein, "maintained" means that the relative look and features (i.e. shape and size) of the ornamental imprint is maintained upon the surface of the dough product throughout the baking process. As soft dough is baked, the dough tends to spread on the baking sheet, increasing in diameter typically in the range of 10% to 40%. During baking, the thickness of the soft dough also undergoes changes, as the dough pieces settle to a substantially regular thickness. During this process, an ornamental imprint upon the surface of the dough product also undergoes changes; however, in accordance with the present invention, the pattern and dough are such that the ornamental imprint substantially retains its relative dimensions and shape with respect to the overall dough product.

In preferred embodiments, a method is provided to apply a substantially similar, reproducible ornamental imprint on the surface of individual dough pieces, such that the baked product will contain appreciable, substantially similar ornamental imprints thereon. That is to say, when a batch consisting of a desired number of individual cookie dough pieces is prepared with a desired imprint according to the inventive method, the resultant imprinted individual dough pieces will appear substantially similar after formation, as they are to be packaged for shipment to the end consumer. Similarly, the baked product resulting from the imprinted individual dough pieces of the invention will share a substantially similar appearance from one to the other. As used herein, substantially similar appearance means that the dough pieces or dough products can vary in minor ways that do not affect the basic configuration of the ornamental imprint contained thereon.

In one embodiment, the method comprises forming an extruded soft cookie dough cylinder; cutting the soft cookie dough cylinder to provide individual soft cookie dough pieces; transferring the individual soft cookie dough pieces onto a movable conveyor; and controllably applying an ornamental imprint on a surface of each individual soft cookie dough piece in a desired manner while the individual dough pieces are transported by the movable conveyor, thereby providing the ornamental imprint aligned to each individual soft cookie dough piece.

The methods according to the invention can be utilized with any type of soft dough commonly used to manufacture sweet dough products, such as cookies. As used herein, "soft dough" refers to baking dough from which softer baked goods are made, in particular the soft type of cookies regarded as being similar to homemade cookies. Examples of soft types of cookies include peanut butter cookies, sugar cookies, and the like. Typical soft dough will have comparatively high sugar and high shortening content, typically in the range of 50–70 baker's percent (weight percent as compared to total flour weight) or more, for each ingredient.

The specific formulation of the soft dough according to the invention is not critical, so long as the dough retains the properties of a soft dough as described herein. Typically, the soft dough will include flour, sugar, fat, leavening agent, water, and other ingredients. Any suitable type or combinations of flour commonly used in or developed for cookie dough can be used according to the invention. A typical flour commonly used in cookie dough is a soft white winter wheat flour with a protein content of 7.5%–8.5%. When stronger flours are used in order to prevent excessive cookie spread during baking, and to preserve the ornamental imprint applied during manufacture of the cookie, the levels of shortening and sugar can be adjusted to maintain optimum tenderness. The flour content of the soft dough according to the invention is typically in the range of about 10% to about 60%, preferably in the range of about 20% to about 40%, and more preferably in the range of about 27% to about 37% by weight.

According to the invention, any sugar suitable for use in a cookie dough can be used. Typical sugars include corn syrup, dextrose, fructose, galactose, glucose, lactose, sucrose, and the like, and combinations thereof. In preferred embodiments, sucrose is used in the form of granulated sugar. Sugar substitutes can also be used according to the invention, including, for example, sorbitol, saccharine, and the like. Such sugar substitutes can be used in addition to, or as a substitute for, the sugar. The total sugar content of the soft dough according to the invention is typically in the range of about 2% to about 50%, preferably in the range of about 10% to about 40% by weight.

The fat in the soft dough can be a solid or liquid fat at room temperature. The fat can be of animal or plant origin, such as, for example, butter, butter oil, canola oil, coconut oil, copra oil, corn oil, cotton oil, lard, margarine, olive oil, palm oil, palm kernel oil, peanut oil, safflower oil, soya bean oil, sunflower oil, tallow, and the like, or combinations thereof. The fats can be emulsified or stabilized with mono- or diglycerides or other emulsifiers known in the art. The total fat content of the soft dough according to the invention is typically in the range of about 5% to about 35%, preferably in the range of about 10% to about 25% by weight.

The soft dough typically includes one or more leavening agents to provide desirable flow properties during baking, resulting in a baked product of desired shape. Any conventional leavening agent can be utilized in accordance with the invention, for example, sodium bicarbonate, phosphates (such as disodium dihydrogen pyrophosphate), and the like. Baking powder, which comprises a mixture of at least one bicarbonate or carbonate salt, at least one acidifying agent and at least one separating agent can also be used. Preferably, sodium bicarbonate is used with sodium diphosphate or disodium dihydrogen pyrophosphate, and a starch as separating agent. These mixtures are available commercially with a fixed composition. In one embodiment, sodium bicarbonate can be used alone, in an amount in the range of about 0.2% to about 0.7%.

Typically, the soft cookie dough will have a moisture content in the range of about 2% to about 25%, preferably in the range of about 8% to about 22% by weight.

The soft cookie dough can include other optional ingredients, such as one or more of texturing agents, flavoring agents, and inclusions. Suitable texturing agents include whole egg or egg white, liquid or dried egg powder, or any egg substitute. When present, the texturizing agent can be present in an amount in the range of about 0.1% to about 10%, preferably in an amount in the range of about 2% to about 5% by weight. Examples of flavoring agents include natural and artificial flavoring agents, including cinnamon, cocoa powder, fruit flavor, ginger, nut flavor (for example, peanut butter or peanut flour), vanilla flavor, and the like, and combinations of these. These are typically present in an amount in the range of about 0.01% to about 8%, preferably in the range of about 0.25% to about 7% by weight.

After at least the flour, water, sugar and shortening are mixed together, a creaming stage is conducted by mixing the dough (as well known) to introduce air into the dough and make the dough lighter. Specifically, the dough's specific gravity starts at about 1.20 or more and decreases to around 0.90 or below after just a few minutes. Preferably, for a soft cookie dough such a creaming stage reduces specific gravity of the dough mix to approximately 1.08 after one minute, 1.03 after two minutes, 0.98 after three minutes, 0.96 after three and a half minutes, and 0.94 after four minutes, although the creaming stage may not be conducted for so long.

The soft cookie dough can include inclusions, as are well known in the art. Examples of inclusions include caramel, chocolate pieces, fruit pieces, oat flake pieces, raisins, whole nuts or nut pieces (for example, walnuts, peanuts and the like), and the like, or mixtures thereof. When present, the inclusions can be of any suitable size, and are typically in the range of about 1 mm to about 25 mm, preferably in the range of about 4 mm to about 10 mm. The amount of inclusions can be adjusted, as desired. Further, the inclusions themselves can be coated, if desired.

Referring now to the Figures, wherein the components are labeled with like numerals throughout the several Figures, and initially to FIG. 1, a schematic diagram of one preferred embodiment of a processing line according to the invention is shown. Ingredients for the soft dough are mixed in a batch process in mixer 10 for approximately 3 to 10 minutes at the appropriate speed to produce a cookie dough of suitable consistency. The mixed dough is then transferred to a hopper 12 of a conventional wirecut machine 11. The hopper 12 can be equipped with grooved feed rolls 14 that are spaced so as to provide a lateral gap of 0.25 to 0.5 inches, depending upon the nature of the dough. The lateral gap between the feed rolls 14 can be adjusted as desired. These feed rolls 14, by rotating toward each other, force the dough through a series of die apertures 16 provided through a die head 13 located at the bottom of the hopper 12. The dough is thus formed into a cylinder 17 as it passes through die apertures 16. While reference is made herein to a "cylinder" of dough that emerges from the die apertures 16, it is understood that the shape of the dough exiting the die apertures can be any shape, depending upon the shape of the dies (for example, circular, square, triangular, and the like). Preferably, the die head 13 includes multiple apertures 16 arranged to extrude a series of dough cylinders 17 in a row transverse to the machine direction A.

A cutting apparatus 18 is operatively positioned at the bottom of the die apertures 16 and moves across the bottom face of the die apertures 16 to cut the emerging dough cylinder(s) 17 into discs or cookie pucks 20 that are deposited onto a conveyor 22. The cutting apparatus 18 can include a wire, blade, knife, or the like as the cutting element and any number of other mechanisms or parts to controllably define the desired cutting motion. Typical wirecut machines 11 feature a cutting element 18 such as a wire that is controllably moved from a cutting position through the dough cylinder 17 and then returned to the cutting position traveling below the extending dough cylinder to be ready for a next cut. Alternatively, the cutting element 18 may move from one cutting position on one side of extending dough cylinder 17 to another cutting position on the other side of the dough cylinder 17 so as to controllably cut in both directions. The cutting element 18 may further be moved in the direction of dough extension and/or in its direction of extension (across the dough) to controllably cut the dough as desired. With multiple dough cylinders 17 arranged in a row, each dough cylinder 17 can be cut at the same time. When a wire is used, the diameter of the wire can be adjusted depending upon the cookie dough to be cut. For example, heavier wires can be used when the dough contains particulate ingredients, such as inclusions. Thinner wires can lead to smoother tops and are more suitable for soft doughs. Wires can be circular in cross-section, or they can be saw-toothed or flat, like a narrow blade, as is conventional in the art.

The individual soft cookie dough pieces 20 preferably drop or are placed onto a conveyor 22 of any conventional or developed type from the wirecut machine 11. The conveyor 22 can be run continuously so that a row of cookie dough pieces is deposited in a new position adjacent to the previous row with each wire stroke. The spacing of each row is controlled by the speed of the conveyor. Preferably, the rows are deposited adjacent to one another for subsequent packaging, and more preferably in side contact with one another to provide a relatively tight array of cookie dough pieces 20. After a number of rows have been deposited in succession, additional speed can be temporarily added to the conveyor belt to create a larger gap between the two adjacent rows of cookies. In this manner, sets of arrays of cookie dough pieces can be deposited on the conveyor. For example, sets of six-by-six cookie dough pieces can be created by providing a series of six die apertures, depositing six rows of cookie dough pieces, and thereafter, increasing the conveyor speed to create a larger gap before the next set of six-by-six dough pieces are deposited.

Alternatively, the conveyor can be intermittently driven to provide an indexed movement thereof having conveyor advances separated by dwell or rest periods. Similarly as that described above with continuous movement, dough pieces 20 can be deposited in rows defined by the die apertures 16 and adjacent to one another (preferably touching one another) as determined by the degree of each advancement. Preferably though, the dough pieces would be deposited (as a row) while the conveyor 22 is in a dwell period, after which an indexed position would occur for the next deposit. Also like that described above, a greater advancement could be controllably performed after a desired array of dough pieces 20 are deposited in adjacent rows. Providing the dough pieces 20 in such an array facilitates packaging of that array and provides access to cut any transport substrate (described below) onto which the dough pieces may be deposited for being packaged with the cookie dough pieces 20.

The conveyor 22 is illustrated in FIGS. 2 and 3 as part of a system that preferably works in conjunction with the wirecut machine 11. The conveyor 22 is generally illustrated as a continuous loop of flexible material positioned around first and second conveyor rollers 23. One or both of the rollers 23 can be driven directly or indirectly by a motor to thereby move a surface of the conveyor 22 in the machine direction A. The conveyor 22 can be formed of any appropriate material that is sufficiently strong to support both the weight of the moving dough and also any externally applied forces, without breaking or significantly deforming. Any backing roller(s), plate or other support can additionally be used under the belt if additional support is needed under a particular area of the processing line, such as under the pattern mechanism (described below). Such backing rollers are known in the art. The conveyor material should also be sufficiently flexible that it can conform to the diameters of the rollers around which it bends. Examples of suitable materials include a woven nylon or polyester belt, PVC coated fabrics, or fabrics coated with a non-stick substance such as coatings polytetrafluoroethylene, which is commercially available under the trade designation TEFLON®. The top surface of the conveyor 22 can, in some embodiments, additionally include one or more coatings that modify the desired amount of friction and release between the dough pieces 20 being conveyed and the conveyor surface. For example, the conveyor surface can include a nonstick coating to prevent or minimize sticking between the conveyor surface and individual soft cookie dough pieces 20. Alternatively, the conveyor 22 can include a coating material that provides for some friction between the dough pieces 20 and the conveyor surface, while also providing sufficient release properties so that the dough tends to easily release from the conveyor surface. The conveyor 22 itself can be made of a material that provides these release and frictional properties without any additional coatings, if desired. In addition, a continuous sheet 25 may be provided to run over the conveyor surface, the sheet 25 being preferably of suitable material, for example, greaseproof paper, or other coated or uncoated papers and the like, which can be cut to the correct size for packaging before freezing or refrigerating. When provided, this continuous sheet 25 of material can be used to facilitate packaging of the formed dough products, by providing a substrate for transferring the dough products into suitable packaging. The sheet 25 can be supplied by any conventional way.

Referring to FIGS. 2 and 3, the system includes a subframe assembly (not specifically illustrated) for movably supporting upper rollers 26 and lower rollers 27 relative to a support frame or the like (not shown). The subframe provides interconnecting support for the rollers 26 and 27 so that they may move together in a direction that is generally up and down for raising and lowering the conveyor 22 and thereby moving the sheet 25 (when provided) in a direction generally perpendicular to the processing direction A. Such motion is preferably substantially linear, but it may instead include rotary motion at one or more points. A system used for moving the subframe up and down preferably includes a drive such as motor (not shown) that is functionally connected to and controlled by a motion control system (not shown). The motor may be any type of motor or the like preferably with precise motion motoring and control and that is operatively connected to move the upper and lower rollers 26 and 27 together by way of a subframe.

It is also contemplated that any other drive device or mechanism may be utilized, either known or developed, to move the subframe such that the functional aspects of the present invention are realized. For example, the subframe may utilize guide rods and bearings as are well known in the art and any lifting means such as a motor connected with the subframe by a belt or chain drive, an air cylinder, hydraulic cylinder, or a linkage mechanism and motor arrangement. Additionally, to provide substantially linear movement, a rack and pinion drive or scissor linkage could be used. For motion with rotary movement, a swing arm or four-bar linkage may be used.

In FIG. 2, the sheet 25 is shown schematically positioned on the conveyor 22. Further, a die head 13 at the bottom of a hopper 12 of a wirecut machine 11 is shown with a stream of cookie dough as dough cylinder 17 positioned above the sheet 25. Also, a centerline 28 passing through centers of the rollers 23 is illustrated for reference to the upper and lower rollers 26 and 27. Further, the upper rollers 26, the lower rollers 27, and the conveyor 22 are illustrated in a down position of the subframe. That is, the upper portion of the conveyor 22 is in a normal transport position that is preferably generally horizontal such that the sheet 25 may easily pass beneath the die head 13 of the wirecut machine 11. As illustrated, the lower rollers 27 are positioned at a distance away from the centerline 28 that is greater than the distance of the upper rollers 26 from the centerline 28. As such, the length of the conveyor 22 below the centerline 28 is greater than the length of the conveyor 22 above the centerline 28.

Referring to FIG. 3, a modified schematic view of the system of FIG. 2 is illustrated; however, the upper rollers 26, the lower rollers 27, and the conveyor 22 are illustrated in an up position of the subframe as it is moved toward the die head 13 of the wirecut machine 11. As illustrated, the sheet 25 is in a raised position such that it may receive a row of cookie dough pieces 20. As illustrated in FIG. 3 the upper rollers 26 are positioned at a distance away from the centerline 28 that is greater than the distance of the lower rollers 27 from the centerline 28. As such, the length of the conveyor 22 above the centerline 28 is greater than the length of the conveyor 22 below the centerline 28. That is, the extra belt length that was below the centerline 28 in the down position of FIG. 2 is now above the centerline 28 in the up position of FIG. 3. As a result, the conveyor 22 may be moved up and down without being stretched.

In FIG. 2, with the subframe down, one or more dough cylinders 17 are being extruded (as such preferably is a continuous process) toward the supported sheet 25 or toward the conveyor surface itself, if sheet 25 is not used. Cutting element 18 is positioned in a ready-to-cut position on one side of the dough cylinders 17. Preferably the subframe is controllably lifted to position the sheet 25 (or conveyor surface) at a desired spacing from the bottom of the die head of hopper 12 to receive the dough pieces 20 (arranged in a line into the page; only the side-most one being shown). Preferably, the spacing between the die head 13 and the sheet 25 is controlled such that the dough pieces 20 are slightly squished between the bottom of the die head 13 and the sheet 25 to flatten them a small amount. This causes slightly spaced dough pieces based upon the ability to be deposited to become in side contact with one another from row to row to create a tight array. While the subframe is up and to sever the dough piece 20 (or row thereof) from the dough cylinder 17, the cutting element 18 is controllably moved through the dough cylinder 17 to the other side thereof. With continuous dough extrusion, a new dough cylinder 17 will immediately begin extending from the die head 13. Then, either by continuous movement of the conveyor 22, or by an indexed advancement forward, a new dough piece 20 or row of dough pieces 20 can be positioned adjacent to the previous dough piece 20 or row thereof at any desired spacing depending on the proper control and timing aspects of the process.

Such movements of the conveyor 22, the subframe, cutting element 18 and dough extrusion process can be controllably provided in any known or developed manner. Certain specific mechanisms, techniques, and methods are described, for example, in co-pending U.S. patent application Ser. No. 10/229,962 filed Aug. 28, 2002 that is commonly owned by the assignee of the present invention and the entire disclosure of which is fully incorporated herein by reference.

Suitable wirecut devices are available from commercial sources, such as APV Baker, Inc. (Goldsboro, N.C.). Other known or developed wirecut devices can be used to provide the individual dough pieces as desired.

The series of die apertures 16 of the wirecut apparatus 11 can include any desired number of individual apertures 16, thereby producing a series of dough cylinders 17 that are cut into individual dough pieces 20. In one preferred embodiment, the series of die apertures 16 includes six, thereby producing rows of six individual dough pieces 20 on the conveyor 22.

The individual soft cookie dough pieces 20 are carried by conveyor 22 to an imprinting mechanism 30, located at a position downstream of the wirecut apparatus 11. An imprint can be formed by any process comprising adding to, removing from, or otherwise modifying the dough piece in some desired way. For example, an imprint can be formed on each individual dough piece such as by patterning, stamping or applying pressurized air or the like to provide an imprint.

Generally, the imprinting mechanism 30 includes an imprinting head, which preferably includes one or more imprinting devices that may be movably operatively supported relative to the plane of conveyance of dough pieces 20. As shown in FIGS. 2 and 3, an imprinting mechanism 30 can be mounted above another conveyor 32 provided at a position downstream of the conveyor 22 of the wirecut machine 11. The spacing between the imprinting mechanism and the surface of the conveyor 32 can preferably be adjusted depending upon the particular type of imprinting device to be utilized in accordance with the invention. Additionally, support elements can be provided that are adjustable to thereby adjust the depth to which the imprinting mechanism will penetrate the dough. Any support structure and mechanisms are contemplated for operatively and adjustably supporting such imprinting devices in position.

The imprinting head can comprise a rotary patterning device, a linear stamping device, a walking stamping device, or any combination thereof. The type of imprinting head utilized can be determined based upon such factors as the size and configuration of the desired imprint, the complexity of the desired imprint, the size of the soft cookie dough pieces to be imprinted, the particular cookie dough formulation utilized, the alignment requirements and the like.

Any number and combination of imprinting heads can be used in accordance with the invention. For example, when a desired pattern to be applied includes features that run in a lengthwise direction (machine direction) as well as features that run a direction widthwise (transverse direction) of the dough piece, a first imprinting head can be used to provide the pattern features in the lengthwise direction, while a second imprinting head can be used to provide the pattern features in the direction widthwise of the dough piece. On the other hand, all such features can be patterned from a single imprinting head. In some embodiments, it can be desirable to provide an ornamental design pattern having features of varying depths in the dough piece. According to these embodiments, single or separate imprinting heads can be used to provide pattern features having individual depths. When multiple imprinting heads are provided, each individual imprinting head can be independently movable and drivable with respect to each other such as by comprising independent drive devices. Alternatively, the numerous imprinting heads can be part of a common mechanical system and can be moved together. In any of these multiple head embodiments, each imprinting head can be operatively attached to support members in such a way to permit relative movement with respect to each other in addition to their position to the conveyor 32.

Figure 4:
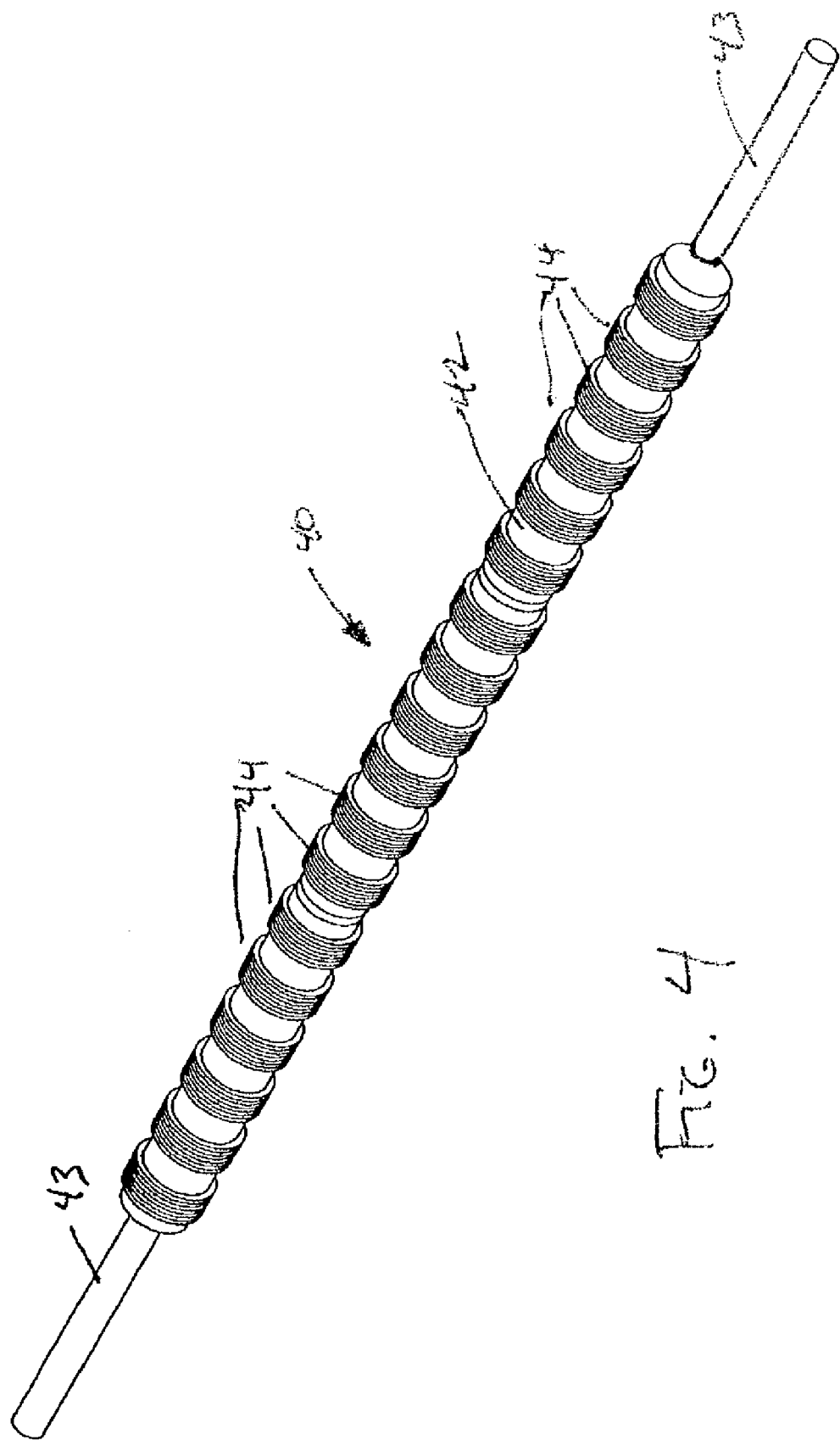
FIG. 4 is a perspective view of a rotary-type patterning roller that is usable in accordance with the present invention for providing imprints to dough pieces as part of a continuous manufacturing process.

Referring to FIG. 4, a perspective view of pattern roller 40 is shown, wherein the pattern roller 40 comprises a rotary type imprinting device. The illustrated rotary pattern roller 40 comprises a shaft 42 that is to be conventionally mounted to rotary bearing supports. FIGS. 2 and 3 also schematically illustrate the use of a single pattern roller 40 as the imprinting mechanism 30. As shown in FIG. 4, shaft extension portions 43 facilitate such rotary mounting. The shaft 42 further includes marking areas 44 which are spaced across the length of the shaft 42. Each marking area 44 contains the negative of the ornamental imprint to be provided onto the surface of a cookie dough piece 20. For example, in the embodiment shown in FIG. 4, the pattern roller 40 will provide cookie dough pieces with a series of parallel-spaced channels that extend in the machine direction. Other configurations of the marking areas can be provided, depending upon the desired ornamental imprint. For example, when a criss-cross pattern is to be imprinted on soft cookie dough pieces, each marking area 44 can include the negative of a criss-cross pattern to be imprinted in each individual cookie dough piece 20. Further, the shaft can include any number of marking areas 44, as desired. As shown, shaft 42 with the series of marking areas 44 is designed to imprint three adjacent lanes (across the machine direction) with each lane having six dough pieces deposited thereon. Shaft portions 43 allow rotational support across all lanes.

The rotary pattern roller 40 is preferably rotatably mounted on bearing elements of a support, thereby allowing the rotary pattern roller 40 to rotate about its axis as cookie dough pieces 20 travel beneath it. Preferably, the distance between the rotary pattern roller and the conveyor 32 is adjustably set to be slightly less than the thickness of a cookie dough piece 20 to be imprinted. In this embodiment, an imprint will be formed on the top surface of a soft cookie dough piece 20 when the dough piece 20 passes underneath the pattern roller 40. According to this embodiment, the rotary pattern roller 40 need not be, but may be, movable in the vertical plane once set in position. In other embodiments, the rotary pattern roller 40 can be provided with spring or shock mechanisms along its support members to permit controlled movement of the pattern roller 40 away from the surface of conveyor 32. Thus, the rotary pattern roller 40 can be positioned at a lower level with respect to the conveyor surface until it encounters a cookie dough piece 20, at which time the shock mechanisms of the rotary pattern roller 40 will absorb energy to allow the pattern roller 40 to raise as desired to run over the surface of the cookie dough piece 20, imprinting the cookie dough piece 20 in the process. Such roller positions can be conventionally controlled by hard stops or using selected biasing forces, for example.

When the desired imprint comprises a pattern to be applied to each individual cookie dough piece 20 such as a criss-cross pattern, the spacing of any marking features that extend at all transversely to the machine direction A (that is axially along the shaft 42 and as opposed to features running only in the machine direction) are preferably positioned on the shaft as correlated between the shaft's circumference (at the depth thereof that will ride on dough surface) and dough piece spacing in the machine direction. For example, when the cookie dough pieces 20 to be imprinted are arranged in an array of plural adjacent rows, the cross-type markings will preferably be spaced around the circumference of the shaft by a circumferential distance equal to the center-to-center spacing of the dough pieces 20 in the machine direction. Thus, once the shaft 42 is initially set for proper alignment with a first dough piece 20, the shaft 42 will rotate as correlated with conveyor movement so that successive marking areas will contact with successive rows of cookie dough pieces 20 at proper alignment, thereby imprinting the cookie dough pieces 20 in a continuous manner. That way, each cookie dough piece 20 in an array of adjacent rows can be effectively patterned with each pattern properly aligned on each dough piece (e.g. as a centered pattern on each dough piece). Features running in the machine direction are controlled by their transverse spacing along shaft 42, see marking elements 44. Where additional spacing is desired between arrays of dough pieces (such as six by six) as provided by temporary conveyor speed increases, the additional spacing should be a whole multiple of the center-to-center spacing of the pieces in the array for alignment of each next array. Advantageously, by depositing the dough pieces in such arrays, proper spacing to ensure pattern alignment is obtained. Moreover, as such patterns are applied, such as by the rotary pattern roller 40, the array integrity helps maintain each of the dough pieces in position as they were deposited and less likely to shift on the sheet or conveyor surface or to lift therefrom.

The rotary pattern roller 40 can, in some embodiments, be independently movable and drivable with respect to the wirecut device such as by comprising an independent drive device (not shown). In preferred embodiments, the rotary pattern roller 40 rotates about its axis by virtue of the frictional movement of dough pieces 20 that are conveyed underneath the pattern roller 40, and no drive device is required.

In some embodiments, the imprinting head can comprise a linear stamping device (not shown). According to these embodiments, the linear stamping device can move in a plane perpendicular to the conveyor belt 32, thereby contacting individual dough pieces 20 and imprinting the dough pieces 20. The contacting face of the linear stamping device carries a negative image of the intended imprint in the form of raised portions that will penetrate the individual dough pieces 20 to form features, such as channels, grooves, or other such imprinted areas, and recesses that will form raised portions on the surface of the dough pieces 20.

A linear stamping device can be operatively attached to support members in a suitable manner to allow controllable movement in a direction perpendicular to the conveyor belt 32. Such a linear stamping device can be independently driven and controllably timed with respect to conveyor movement whether such movement is indexed or continuous so that pattern features are properly aligned to each successive dough piece.

The amount of time that a linear stamping device will be in contact with a dough piece comprises an impulse time. As discussed herein, it is preferable to minimize deformation of the dough pieces during any imprinting process. In one aspect, the process involves imprinting dough pieces as the conveyor 32 continuously moves the dough pieces in a machine direction. For this, the impulse time is preferably set to accommodate the particular speed of the conveyor 32. For example, at higher conveyor speeds, the impulse time should be relatively short, so that the linear stamping device will be in contact with the dough for a relatively short amount of time, and deformation of the dough piece can be minimized. Conversely, when the conveyor is operated at lower speeds, the impulse time can be adjusted to be longer. The impulse time of the linear stamping device can be controlled by any suitable timing mechanism, such as mechanical devices using a timing belt or chain, or as controlled by computer programs that integrate the processing system as a whole and that may utilize mechanical or optical sensors or vision systems for tracking the process. Where the conveyor is indexed, stamping would preferably be done during dwell periods. However, with continuous conveyance, the impulse time will cause some dough pattern deformation in the machine direction. For features of the pattern running in the machine direction, such deformation would only be from shearing along the dough interface with the pattern forming feature. Such can be minimized by using non-stick surfaces or treatments (e.g. dusting with flour). In a transverse direction, however, deformation would include an increase in the size of the feature beyond the size of the feature on the pattern based upon dough movement during the impulse time. Thus, with known conveyor speeds, impulse time and feature sizing, desired imprint patterns can be made by selectively controlling these parameters.

In preferred embodiments, multiple linear stamping devices can be utilized, so that multiple rows of individual dough pieces can be simultaneously imprinted. Preferably, each of the linear stamping devices will correspond with a support member to be operatively supported and maintained in alignment with the conveyor to correspond to the positioning of individual dough pieces as they will be arranged by the die apertures 16 and as they will be placed at lateral positions along the width of the conveyor. Conventional linear slides, guides, or mechanical systems or devices can be used to provide alignment between the linear stamping devices and support members.

In yet other embodiments, the imprinting head can comprise a walking stamping device. The movement of such a walking stamping device includes movement in a direction parallel to the conveyor 32, as well as in the direction perpendicular to the conveyor belt. Preferably, a walking stamping device will be movable at a speed commensurate with the speed of the conveyor. Thus, the impulse time of the walking cutter can be made to be independent of deformation of the individual dough pieces, since the walking cutter can move along with the dough pieces in the machine direction during contact with the dough pieces. Again, the walking stamping device can be independently movable by providing an independent drive mechanism, and relative movement of the walking stamping device with respect to the wirecut machine and conveyor can be coordinated using devices conventionally known in the art.

In further embodiments, imprinting of the individual soft cookie dough pieces can be accomplished using high-pressure air. According to this embodiment, nozzles are positioned above the plane of the conveyor 32, in alignment with the advancing individual dough pieces on the conveyor belt. Each nozzle serves as a source of high-pressure air. Suitable pressures can be chosen according to the desired imprint to be made, and the desired depth of the imprint. Such patterning ability can be empirically determined. The air pressure is preferably chosen to be at or above a minimum level, such as to provide an imprint that can meet the desired characteristics discussed herein. Also, the air pressure is preferably not so high as to deform or destroy the individual soft dough pieces on the conveyor. A suitable pressure range is about 2 psig (pounds per square inch gauge) to about 200 psig, preferably about 20 psig to about 100 psig, most preferably about 20 psig to about 40 psig.

It is contemplated that the imprinting head of any type can be heated, chilled, coated or vibrated at an ultrasonic frequency to provide enhanced imprinting capabilities. When heated, the temperature of the imprinting head is chosen to be in a range such that the imprinting head will not bake the surface of the individual dough products on the one hand, and will reduce sticking of the dough to the surface of the imprinting head on the other hand. When chilled, again the temperature of the imprinting head is preferably chosen to be in a range to achieve the reduction of dough sticking.

In some embodiments, the imprinting head can be coated with a material to provide enhanced imprinting capabilities. For example, the imprinting head can be coated with a lubricious polymeric material such as polytetrafluoroethylene (sold commercially under the trademark TEFLON™), which can be bonded to the surface of the imprinting head. Alternatively, the imprinting head can be fabricated from a polymeric material that can provide lubricious properties to the imprinting head.

In some preferred embodiments, the imprinting head can be vibrated at an ultrasonic frequency to provide enhanced imprinting capabilities. According to these embodiments, the imprinting head is attached to an ultrasonic generator and a transducer. It is preferable that the imprinting head vibrate at an ultrasonic frequency (for example, greater than or equal to about 20,000 Hz), which thereby reduces sticking of the dough material to the imprinting head. The generator can also be referred to as an ultrasonic frequency generator. In operation, an ultrasonic frequency generator can convert an electrical input (for example, 60 Hz AC, 117 VAC, or 240 VAC) to electrical pulses that can be used by other equipment. In particular, the generator of the invention is preferably connected to a transducer that converts electrical pulses received from the generator to mechanical vibrations. In one preferred embodiment of the invention, the generator converts an electrical input to about 20,000 electrical pulses, which the transducer then converts to about 20,000 mechanical vibrations per second. Various other types of equipment can be used in connection with this embodiment, such as, for example, a booster or reducer that can effectively increase or decrease the vibratory movement of the imprinting head, as desired. Preferably, the stamping mechanism is configured in such a manner that only a portion of the stamping mechanism is vibrated, for example, the imprinting head, such that vibration does not translate to other parts of the processing equipment described herein.

In general, it is preferred to minimize any unintended deflection of the individual soft cookie dough pieces during imprinting of the dough pieces so that the individual dough pieces do not become stretched or distorted thereby increasing the possibility of the ornamental imprint formed on the dough pieces becoming misaligned with an additional processing step such as a subsequent imprinting step (when multiple imprinting steps are included) or a packaging step. As such, the conveyor 32, preferably provides sufficient support or backpressure for the particular imprinting step being performed. For example, where the imprinting step comprises imprinting the individual dough pieces with stamping devices with significant force, the conveyor 32 preferably provides adequate support so that deflection of the conveyor belt 32 is minimized. This can be accomplished by utilizing a rigid belt as part of the conveyor or by providing support structure or a support device such as a plate or movable support device(s) positioned generally below the imprinting devices. Less support may only be needed where the imprinting step does not involve impacting the individual dough pieces with significant force, for example, when the stamping device comprises a rotary pattern roller. In that case, a roller provided on the conveyor backside may be provided.

Although the invention has been described with reference to wirecut processes for forming individual soft cookie dough pieces, it will be appreciated by one of skill in the art that other dough piece forming methods can be utilized to produce the individual dough pieces within the scope of the invention.

Figure 5:
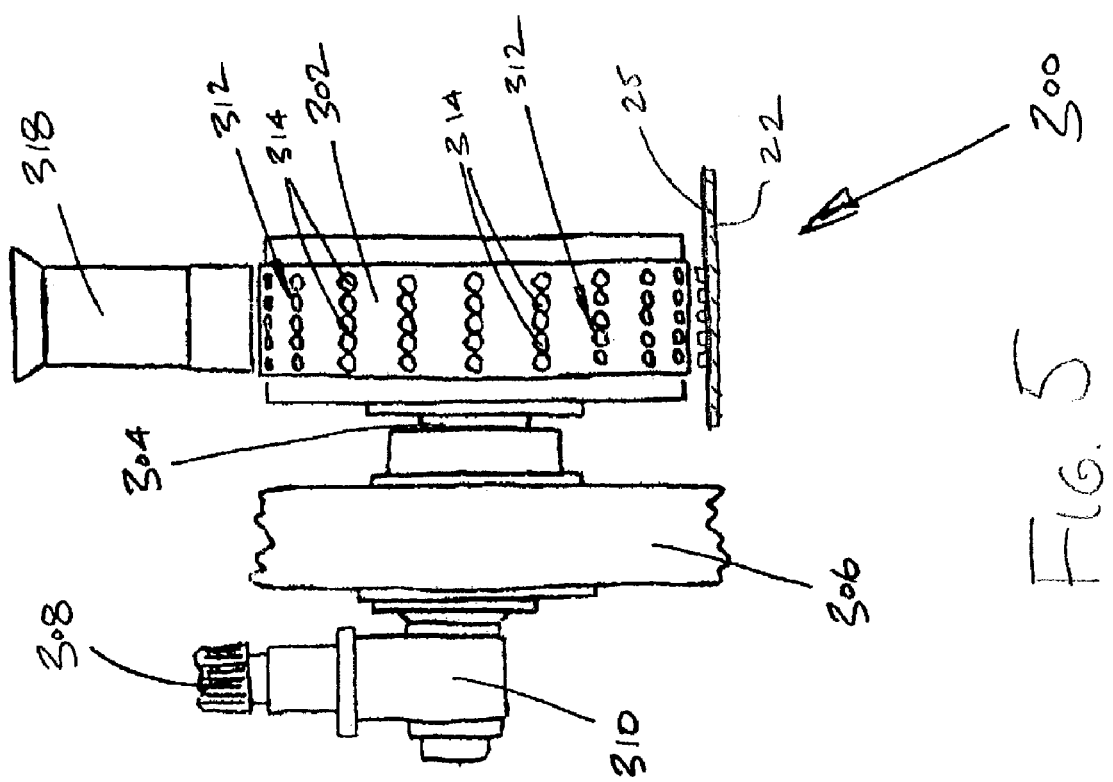
FIG. 5 is a front view, partially in cross-section, of a roller-type apparatus for depositing cookie dough pieces and for imprinting a surface of the dough pieces during deposition.

As mentioned above, various devices may be used to form the cookie dough pieces 20. For example, a roller former type extrusion device 300 is illustrated in FIG. 5 that may be used to form cookie dough pieces in accordance with the present invention. One such extrusion device is commercially available as type W 800-200 from Hosokawa Bepex GmbH of Leingarten, Germany. The extrusion device 300 generally comprises a rotatable cylinder 302 mounted on a spindle 304, which spindle is supported by a support structure 306. The spindle 304 is driven by a motor 308, which includes a gearbox 310. Accordingly, the rotatable cylinder 302 may be rotated at any desired rate to extrude and deposit cookie dough pieces in accordance with the present invention as described below.

The rotatable cylinder 302 includes rows 312 of individual shaping cavities 314 for forming the cookie dough pieces 20. In operation, the rotatable cylinder 302 rotates continuously when used with a continuous motion conveyor to supply cookie dough pieces from the shaping cavities 314 and deposit or place the cookie dough pieces onto a moving surface, such as provided by a conveyor 22 surface or a sheet 25. As illustrated, each row 312 includes five individual generally circular shaping cavities 314. Any desired number of shaping cavities 314 may be used for each row 312 and the shaping cavities 314 may be formed in various sizes and shapes to form different products. A row 312 of shaping cavities 314 may comprise shaping cavities 314 of the same size and shape or may comprise shaping cavities 314 of varying sizes and/or shapes.

Each of the shaping cavities 314 of the extrusion device 300 preferably includes a plunger 316 (see FIG. 6), which is capable of pushing or extruding a piece of dough out of a shaping cavity 314. Generally, each of the plungers 316 of a row 312 of shaping cavities 314 is actuated simultaneously to supply a complete row of cookie dough pieces 20. The shaping cavities 314 are filled with a product such as cookie dough by supplying the cookie dough to a hopper 318, which includes a loading device (not shown) that fills the shaping cavities 314 with cookie dough, usually by a pressurized feed roller or the like. The hopper 318 also typically includes a scraping device (not shown), which scrapes excess dough (that comes from filling the shaping cavities 314) from the outer surface of the rotatable cylinder 302 and recycles the excess dough back to the hopper 318.

It is understood that any number of rotatable cylinders may be used in a processing system 320 in accordance with the present invention as such cylinders can be arranged side-by-side to cover multiple lanes. It is further contemplated that a single rotatable cylinder 302 having shaping cavities 314 aligned to individual lanes of a multilane system may be used. That is, multiple rotatable cylinders 302 positioned on a common spindle or axle are not required. Also, because the roller former extrusion device 322 is capable of forming complete cookie dough pieces, no cutoff device is required.

Figure 6:
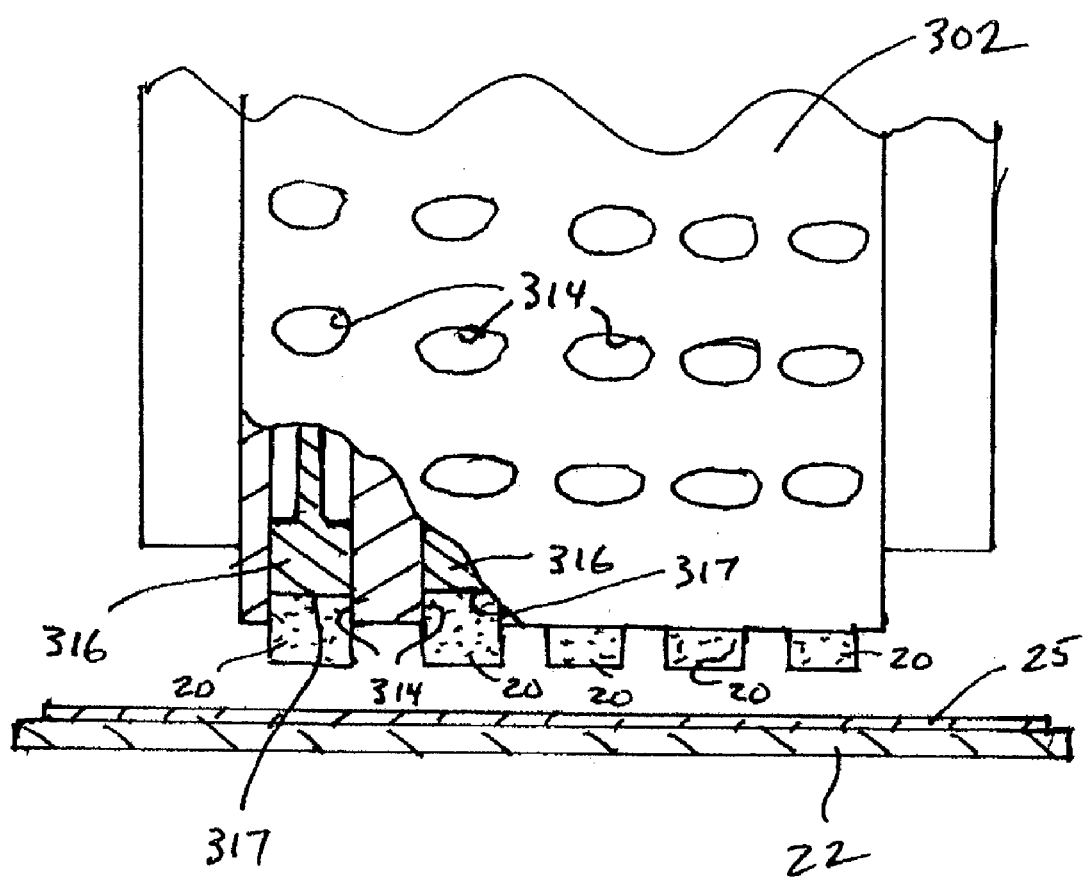
FIG. 6 is an enlarged portion of the roller-type apparatus of FIG. 5 with a portion thereof in cross section showing movable plungers within dough forming cavities, which plunger head surfaces include imprint making patterns.

A portion of a single lane of a processing system is shown in greater detail in FIG. 6 (partially in cross-section) and shows a row of cookie dough pieces 20 that are in the process of being deposited onto a surface of a sheet 25. In operation, as the rotatable cylinder 302 rotates, the plungers 316 controllably extend to push the cookie dough pieces 20 out of the shaping cavities 314. As illustrated, the plungers 316 are still entirely within the cavities 314 of the row of dough pieces 20 that are being deposited. The plungers 316 may be controlled to extend entirely from the cavities 314 to facilitate the deposition of the dough pieces 20, or the dough pieces 20 may fall from the cavities without such plunger extension. Because the cookie dough is usually sticky and because the cookie dough is usually forced into the shaping cavities 314 with some pressure, it may be desirable to use non-stick materials for the plunger head surface 317 and/or the cavity wall of cavities 314. Other devices may also be used to help separate the cookie dough pieces 20 from the plunger surfaces 317 as the rotatable cylinder 302 rotates to deposit cookie dough pieces.

In accordance with the imprinting aspect of the present invention, the plunger surfaces 317 may further be modified to have a pattern thereon, the negative of which is to be patterned onto the top surface of each cookie dough piece 20. That is, the plungers 316 can be utilized to provide a dough impression in accordance with the present invention without the need to provide an imprinting mechanism as a separate station. The pattern is instead produced at the same time that the dough piece is defined and deposited onto the conveyor 22 or sheet 25. Providing a pattern to the plunger head surface 317 can be done by any conventional or developed method for providing a relief pattern thereon, such as by machining, etching, material deposition and the like. In a similar sense, a patterned component or cap-type element can be added to a conventional plunger head to create the relief pattern, which component can be attached to the plunder 316 in any conventional way.

In accordance with the present invention, a roller former type extrusion device such as the extrusion device 300 or 322 described above may be used to deposit cookie dough pieces onto a conveyor or sheet as a continuous process. That is, the rotatable cylinder 302 preferably rotates continuously and the conveyor 22, which carries the dough pieces, preferably moves linearly in a continuous manner. The speed of the conveyor 22 is preferably timed with respect to the rotational motion of the rotatable cylinder 302 such that a desired spacing between the rows of cookie dough pieces is obtained. Moreover, increased spacing, such as between arrays of dough pieces can be done by a temporary increase in conveyor speed.

According to preferred methods for making cookies, such as peanut butter cookies to be frozen raw for baking elsewhere, dough pieces can be provided with a thickness of about 3 inches or less, preferably with a thickness in the range of about 0.75 inches to about 2 inches. The dimensions of the individual dough pieces will vary depending upon the size cookie to be provided to the consumer. Typical dough pieces formed from the wirecut process described herein are approximately 0.75 inches thick in a frozen state, when the dough pieces are formed to provide a 2 ounce cookie when baked. Typical diameters of the individual dough pieces, when the dough pieces are provided in the form of pucks, are in the range of about 1 inch to about 4 inches.

The dimensions of the imprint provided on a surface of the dough pieces will be determined taking into consideration such factors as the formulation of the cookie dough, whether inclusions are present in the cookie dough, the complexity of the design to be imprinted, and the desired clarity and impact of the imprinted image on the end consumer. Typical imprints are provided in the range of about 10% to about 75% of the thickness of the dough piece, preferably in the range of about 25% to about 50% of the thickness of the dough piece. For example, in one preferred embodiment wherein the dough piece comprises peanut butter cookie dough, preferred imprints can be in the range of about 20% to about 50% of the thickness of the dough piece. When the dough includes inclusions, the ratios given above can be higher, to accommodate the presence of the inclusions.

One particularly preferred embodiment of the invention provides a peanut butter cookie having an ornamental imprint on a surface thereof, wherein the ornamental imprint comprises a fork tine imprint.

The spacings of individual portions of the imprints can be adjusted to provide the desired complexity of the ornamental design, as well as the texture of the final product when baked. There can be equal or unequal numbers of depressions and ridges, which may have equal or unequal aspect ratios in comparison of width, height or length. Such pattern features, or any one or more feature thereof, can extend over the entire dough piece or partially as desired. For example, when the ornamental imprint is provided in the form of a fork tine imprint, as with peanut butter cookies, the individual tines of the fork imprint can be provided with closer spacing between the tines when it is desired to obtain intervening areas of a drier, more crust-like texture. Alternatively, the individual tines of the fork imprint can be spaced farther apart when it is desired to maintain a more moist texture to the surface of the cookie. In one preferred embodiment, the width of the grooves representing individual fork tines is substantially equal to the width of the raised areas separating the grooves. In one embodiment, the individual grooves representing individual fork tines are 0.14 inches in diameter, and the raised areas separating the grooves are also 0.14 inches in diameter. In accordance with the present invention, conventional three or four tine forks (as well as others) can easily be patterned.

The cross-sectional shape of imprinted grooves according to the invention can be any desirable shape, for example, V-shaped, U-shaped, square-shaped, and the like. In one preferred embodiment, where the imprint represents fork tines, the cross-sectional shape of the individual grooves comprising the imprint is square-shaped.

In some preferred embodiments, the imprint can provide textural properties to the surface of the cookie dough piece, when the dough piece is baked. For example, the presence of a three-dimensional imprint on the surface of a dough piece can create raised areas of the cookie dough surface that are thinner (in the direction across the top cookie surface, for example) than the remainder of the dough piece. These raised areas can thus bake more quickly than the thicker portions of the dough piece, thereby affecting the moisture level and mouthfeel of the cookie product, and providing a crusty baked cookie product. Upon baking, the raised areas can appear darker and crisper than the body of the baked cookie product. These darker, crisper raised areas of the cookie product can provide a distinct baked flavor to the cookie.

Additionally, the imprint can provide a pleasing, homemade appearance to the product. For example, the presence of a three-dimensional surface of the dough piece can create raised areas of the cookie dough surface, as described above. These raised areas can brown more quickly in an oven, thus providing a baked cookie product that has a nonuniform surface appearance. Moreover, when the imprint is provided as a fork tine design on the surface of a peanut butter cookie, the presence of the imprint can conjure the image of peanut butter cookies prepared at home and impressed with a fork prior to baking.

Figure 7:
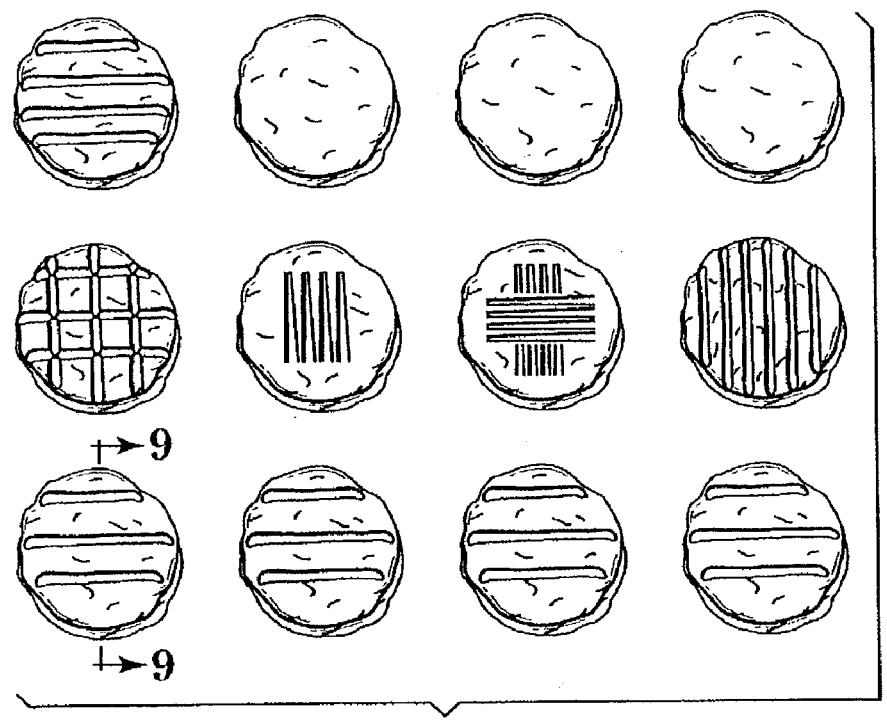
FIG. 7 is a perspective view of soft dough pieces, some having no imprint, some having manually applied imprints, and some having imprints according to preferred embodiments of the invention.
Figure 9:
FIG. 9 is a cross section of a dough piece of FIG. 7.

Referring to FIG. 7, various soft dough pieces are shown, some of which contain imprints according to the invention. Starting at the top left and proceeding left to right, there is shown an imprinted dough piece according to one embodiment of the invention, then three dough pieces containing no imprint. For the second row, there is shown a criss-cross imprint according to one embodiment of the preferred invention, then three manually-impressed dough pieces, wherein the imprint was formed by pressing a fork, flat face downward, into the dough pieces manually. The three manually-impressed dough pieces include a single fork tine imprint (i.e., an imprint formed by a single fork impression), a criss-cross pattern formed by two impressions, in a perpendicular direction, of a fork tine, and a double fork tine impression, wherein the a fork tine was impressed into the dough piece twice, in positions lateral to each other. For the third row, there is illustrated four soft cookie dough pieces according to a preferred embodiment of the invention. The illustrated dough pieces contain grooves formed by a rotary pattern roller according to one aspect of the present invention, having a square cross-sectional shape. FIG. 9 shows a cross-section through one of the dough pieces in the third row (bottom row) to show characteristics of a raw dough piece that is thicker and sharper than when baked.

Figure 8:
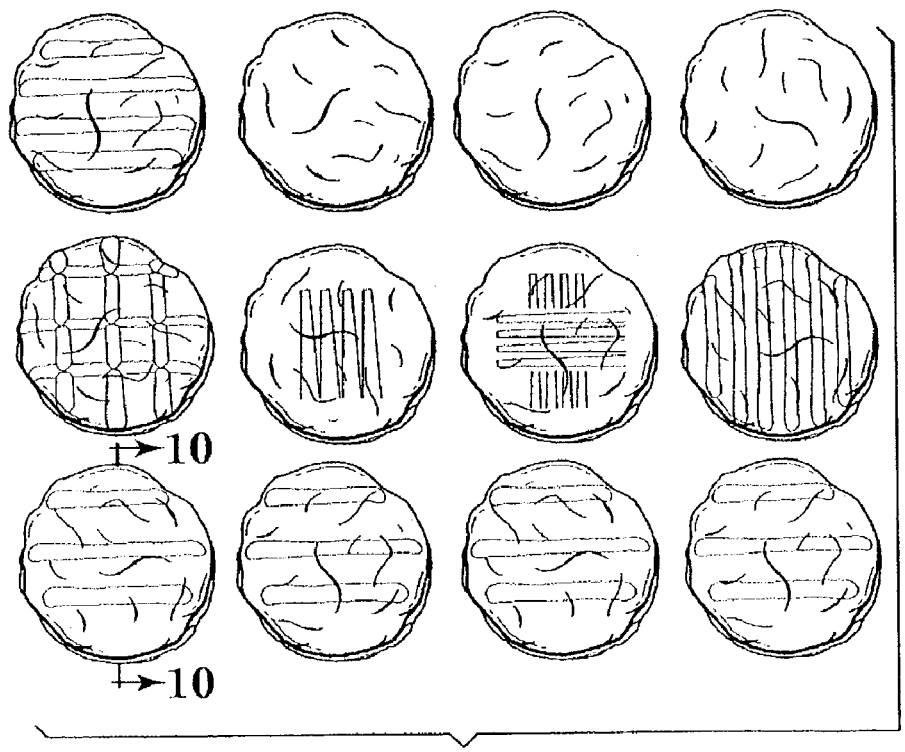
FIG. 8 is a perspective view of baked dough products after baking the dough pieces shown in FIG. 7.
Figure 10:
FIG. 10 is a cross section of a baked cookie corresponding to the dough piece of FIG. 9.

FIG. 8 illustrates the baked dough products that resulted from baking the dough pieces shown in FIG. 7. The positioning of each dough piece is consistent between the figures. As shown, the invention provides baked dough products that simulate a homemade appearance (in the illustrated embodiment, a homemade fork tine appearance). Further, the ornamental imprint on the dough pieces is maintained on the dough product through the baking process. Such visually appreciable imprint being independent of other cookie surface features that naturally result from baking, such as surface irregularities and cracks. FIG. 10 shows a baked version of the dough piece of FIG. 9 as it exhibits a flatter, thinner, and more rounded shape.

Once formed, the individual dough products having an ornamental imprint on a surface thereof can be refrigerated or frozen, as desired. When the dough pieces are provided onto a material, such as greaseproof paper, on the conveyor, the sheets of material can be cut to a desired size, and passed into a refrigerator or freezer, as desired. The cookie dough products can then be placed into appropriate packaging for the desire storage environment (for example, freezer or refrigerator).

Typically, the multiple layers of individual material sheets are stacked in a suitable container. The container typically comprises a corrugate case that is preferably line with a plastic (such a polyethylene) liner material.

Generally, for the commercial consumer (for example, an in-store bakery), the refrigerated or frozen cookie dough pieces are packaged on cut sheets as bulk product in cartons for sale to the customer. A typical format for such consumer would be five to seven layers of plastic film sheets, wherein each sheet comprises four to six columns and four to seven rows of cookie dough products (the number of columns and rows will depend upon such factors as the desired overall size of the shipment, as well as, the size of the individual cookie dough products).

For a household consumer, it is desirable to package the refrigerated or frozen cookie products in smaller, more convenient packages. The dough pieces are thus provided to a consumer as individual cookie pucks that are refrigerated or frozen. When provided in a refrigerated form, the cookie pucks are simply removed from the packaging, placed on a baking surface (for example, a baking tray), and baked. When provided in a frozen form, the frozen cookie pucks are simply removed from the packaging, placed on a baking surface (for example, a baking tray), and baked. According to this particular embodiment, the cookie dough pieces can be referred to as "freezer-to-oven" dough pieces, in that the dough pieces do not require thawing before placing the dough pieces into the oven for baking. Baking can be carried out using a conventional oven at a temperature in the range of about 180° to about 200° C. for about 12 minute to about 18 minutes. One of ordinary skill in the art can determine the appropriate baking conditions for the type of product to be made and the type of oven being used.

The soft cookie dough pieces of the present invention thus provide a significant cost and time savings for a consumer. Particularly in the case where the consumer is an in-store bakery, the soft cookie dough pieces of the invention do not require any additional manipulation by the consumer in order to obtain the baked product. The consumer simply moves the soft dough pieces from the packaging to a baking surface and bakes the dough pieces under the appropriate baking conditions.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

We claim:

1. A method for manufacturing a plurality of soft cookie dough pieces with an ornamental imprint on a surface of the soft cookie dough pieces, the method comprising:
    (a) forming a plurality of soft cookie dough pieces from a quantity of soft cookie dough;
    (b) providing the plurality of soft cookie dough pieces onto a movable conveyor in an arrangement comprising regularly spaced rows and columns for transporting the soft cookie dough pieces in a machine direction;
    (c) applying an ornamental imprint on a surface of the soft cookie dough pieces with an imprint device, the imprint being applied to the soft cookie dough pieces in a similar alignment as compared with one another;
    (d) transferring the soft cookie dough pieces with their applied ornamental imprints from the conveyor for packaging together; and
    (e) controlling the imprint device to reduce sticking of the soft cookie dough to the imprint device.

2. The method according to claim 1, wherein the step of applying an ornamental imprint comprises applying an imprint having a depth in the range of about 2% to about 75% of the thickness of each soft cookie dough piece.

3. The method according to claim 1, wherein the step of applying an ornamental imprint comprises applying a pattern having features that extend in both the machine direction and a direction transverse thereto.

4. The method according to claim 3, wherein the step of applying an ornamental imprint includes contacting a dough surface of each dough piece with an imprint device.

5. The method according to claim 4, wherein the step of applying an ornamental imprint further comprises contacting the individual soft cookie dough pieces with a rotary patterning roller.

6. The method according to claim 4, wherein the step of controlling the imprint device comprises applying ultrasonic energy to the imprint device.

7. The method according to claim 4, wherein a dough contact surface of the imprint device is coated with a nonstick material to reduce sticking of the dough pieces to the imprint device.

8. The method according to claim 4, wherein the step of controlling the imprint device comprises heating the imprint device to reduce dough sticking.

9. The method according to claim 3, wherein the step of applying an ornamental imprint comprises directing pressurized air toward a surface of the dough pieces to deform that surface and to form the imprint thereon.

10. The method according to claim 1, wherein the step of applying an ornamental imprint is conducted after the dough pieces are formed and the imprint is applied by at least one imprint device for contacting and imprinting surfaces of the dough pieces of the arrangement as aligned in a similar manner.

11. The method according to claim 1, wherein a rotary pattern roller is used as the imprint device and includes at least one similar feature that is provided in plural locations as spaced around a circumference of the pattern roller for imprinting such feature to a plurality of dough pieces in a similarly aligned manner.

12. The method according to claim 1, wherein the plurality of dough pieces form an array of dough pieces that are formed and deposited onto a sheet material of indefinite length that is carried by the conveyor, and further wherein the conveyor is driven at increased speed for a period after a first array is formed and before a second array is formed to leave a length of sheet material that is greater between the first and second arrays than the spacing between rows of an array.

13. The method according to claim 12, further comprising a step of cutting the sheet material between a plurality of arrays of dough pieces that are formed and imprinted.

14. The method according to claim 13, in combination with the steps of freezing the dough pieces as arranged in arrays and packaging frozen dough piece arrays as they are provided onto the sheet material and after the sheet material is cut between arrays.

15. The method according to claim 14, in combination with the steps of removing a plurality of the frozen cookie dough pieces from the packaging and baking them.

16. The method according to claim 1, wherein the rows of dough pieces are formed and provided onto the conveyor by a roller-type depositing apparatus comprising a rotatable cylinder with a plurality of rows of forming cavities, and wherein plungers operatively provided within the cavities drive dough pieces from the cavities and onto the conveyor.

17. The method according to claim 16, wherein the step of applying an ornamental imprint is conducted during formation of the dough pieces within the forming cavities by way of an imprint pattern provided onto plunger head surfaces of the plungers for imprinting surfaces of the dough pieces of the array as aligned in a similar manner.

18. The method according to claim 1 wherein the soft cookie dough comprises sugar in an amount in the range of 50 to 70 baker's percent or more.

19. A method for manufacturing a plurality of soft cookie dough pieces with an ornamental imprint on a surface of the soft cookie dough pieces, the method comprising:
   (a) forming a plurality of soft cookie dough pieces from a quantity of soft cookie dough;
   (b) providing the plurality of soft cookie dough pieces onto a movable conveyor for transporting the soft cookie dough pieces in a machine direction, wherein the dough pieces are formed and provided onto the conveyor by a roller-type depositing apparatus comprising a rotatable cylinder with a plurality of rows of forming cavities, and wherein plungers operatively provided within the cavities drive dough pieces from the cavities and onto the conveyor;
   (c) applying an ornamental imprint on a surface of the soft cookie dough pieces in a similar alignment as compared with one another, the imprint being applied while the dough pieces are within the forming cavities by way of an imprint pattern provided onto plunger head surfaces of the plungers;
   (d) transferring the soft cookie dough pieces with their applied ornamental imprints from the conveyor for packaging together; and
   (e) controlling the imprint pattern on the plunger head surfaces to reduce sticking of the soft cookie dough to the imprint pattern.

20. The method according to claim 19 wherein the step of applying an ornamental imprint comprises applying a pattern having features that extend in both the machine direction and a direction transverse thereto.

21. The method according to claim 19, wherein the step of controlling the imprint pattern comprises applying ultrasonic energy to the imprint pattern.

22. The method according to claim 19, wherein a dough contact surface of the rotary pattern roller is coated with a nonstick material to reduce sticking of the dough pieces to the imprint pattern.

23. The method according to claim 19, wherein the step of controlling the imprint pattern comprises heating the imprint pattern to reduce dough sticking.

24. A method for manufacturing a plurality of soft cookie dough pieces with an ornamental imprint on a surface of the soft cookie dough pieces, the method comprising:
   (a) forming a plurality of soft cookie dough pieces from a quantity of soft cookie dough;
   (b) providing the plurality of soft cookie dough pieces onto a movable conveyor in an arrangement comprising regularly spaced rows and columns for transporting the soft cookie dough pieces in a machine direction;
   (c) applying an ornamental imprint on a surface of the soft cookie dough pieces, the imprint being applied in a similar alignment as compared with one another by a rotary pattern roller that includes marking areas for forming imprints, wherein rotary pattern roller rotation is correlated with movement of cookie dough pieces on the conveyor so that successive marking areas will contact successive rows of cookie dough pieces at proper alignment;
   (d) transferring the soft cookie dough pieces with their applied ornamental imprints from the conveyor for packaging together; and
   (e) controlling the imprint device to reduce sticking of the soft cookie dough to the rotary pattern roller.

25. The method according to claim 24, wherein the step of applying an ornamental imprint comprises applying a pattern having features that extend in both the machine direction and a direction transverse thereto.

26. The method according to claim 24, wherein the step of controlling the rotary pattern roller comprises applying ultrasonic energy to the rotary pattern roller.

27. The method according to claim 24, wherein a dough contact surface of the rotary pattern roller is coated with a nonstick material to reduce sticking of the dough pieces to the rotary pattern roller.

28. The method according to claim 24, wherein the step of controlling the rotary pattern roller comprises heating the rotary pattern roller to reduce dough sticking.

29. The method according to claim 24, wherein the rotary pattern roller includes at least one similar feature that is provided in plural locations as spaced around a circumference of the pattern roller for imprinting such feature to a plurality of sequential dough pieces in a similarly aligned manner.

* * * * *